United States Patent [19]

Yoshioka et al.

[11] Patent Number: 4,817,886
[45] Date of Patent: Apr. 4, 1989

[54] FILM CONVEYING APPARATUS

[75] Inventors: Kiyoharu Yoshioka, Tokyo; Masahiko Ito, Yokohama, both of Japan

[73] Assignee: Canon Kabushiki Kaisha, Tokyo, Japan

[21] Appl. No.: 49,167

[22] Filed: May 13, 1987

[30] Foreign Application Priority Data

| May 15, 1986 | [JP] | Japan | 61-109553 |
| Jun. 4, 1986 | [JP] | Japan | 61-128038 |
| Jun. 12, 1986 | [JP] | Japan | 61-136865 |
| Jun. 12, 1986 | [JP] | Japan | 61-136866 |

[51] Int. Cl.$^4$ .................. B65H 16/00; G11B 15/18
[52] U.S. Cl. ................... 242/192; 242/195; 226/186
[58] Field of Search .......... 242/192, 195, 187, 197, 242/206, 209; 226/186, 187, 91, 92

[56] References Cited

U.S. PATENT DOCUMENTS

| 3,613,977 | 10/1971 | Egan | 242/195 X |
| 3,801,040 | 4/1974 | Yamanaka et al. | 242/192 |
| 3,877,627 | 4/1975 | Boase et al. | 226/187 X |
| 4,072,279 | 2/1978 | Lewis | 242/195 X |
| 4,432,509 | 2/1984 | Shirai | 242/195 |

Primary Examiner—David Werner
Attorney, Agent, or Firm—Fitzpatrick, Cella, Harper & Scinto

[57] ABSTRACT

A film conveying apparatus has a first conveying device for contacting the peripheral surface of a roll film such as a rolled microfilm and rotating the roll film in a direction to advance the leading end edge of the film, and a second conveying device adapted to be urged against the surface of the film led out from the roll film and frictionally drive the film. The film conveying apparatus further has a device for temporarily releasing the pressure contact force of the second conveying device to the surface of the film to prevent oblique movement of the film. The first conveying device has a device for transmitting only the rotation in one direction to a drive shaft so as not to impart a friction load to the microfilm. Further, the first conveying device has its portion of contact with the film protruded to ensure the leading-out of the film.

17 Claims, 8 Drawing Sheets

FILM CONVEYING APPARATUS

BACKGROUND OF THE INVENTION

1. Field of the Invention

This invention relates to a film conveying apparatus for automatically leading out and conveying a film such as a rolled microfilm contained in a cartridge.

2. Related Background Art

Figure 1:
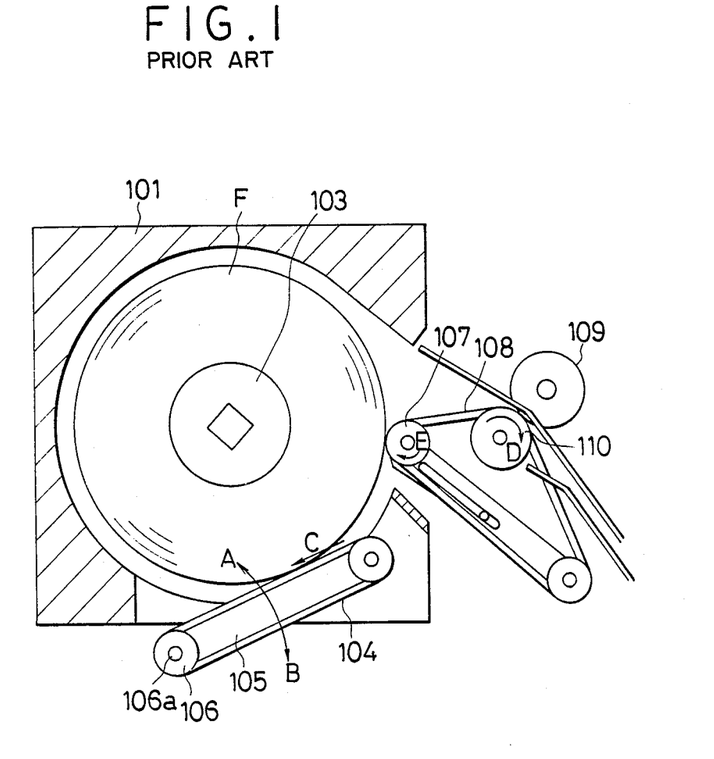
FIG. 1 is a cross-sectional view showing the leading-out portion of a film conveying apparatus according to the prior art and also showing a state in which the roll diameter of a film is large.

What is shown in FIG. 1 of the accompanying drawings has heretofore been available as the microfilm leading-out portion of a film conveying apparatus of this type. In such an example of the prior art, a microfilm F wound on a reel core 103 is rotatably mounted in a cartridge 101. A conveyor belt 104 is rotated in the direction of arrow C by a pulley 106, and a pivotable arm 105 is pivotally moved in the directions of arrows A and B to thereby urge the conveyor belt 104 against and away from the microfilm F. Also, a conveying pulley 110 is rotatively driven in the direction of arrow D to rotate a separating gear 107 in the direction of arrow E through the intermediary of a belt 108. A pinch roller 109 cooperates with the conveying pulley 110 to convey the microfilm F while holding the microfilm therebetween.

In the above-described construction, the leading-out and conveyance of the microfilm F is accomplished in the following manner. The pivotable arm 105 is moved in the direction of arrow A, the conveying belt 104 rotated by the pulley 106 is urged against the microfilm F, and the microfilm F is conveyed by the friction force of the conveyor belt 104. Thereupon, the leading end edge of the microfilm F conveyed to the separating gear 107 is taken out by the tooth top of the separating gear 107 and is fed into between the pinch roller 109 and the conveying pulley 110. Thus, the microfilm F held between the pinch roller 109 and the conveying pulley 110 is conveyed by them and advanced into a guide.

However, in the prior-art apparatus described above, if the direction of conveyance by the pinch roller 109 and conveying pulley 110 is inclined, oblique movement of the film occurs and jamming of the film may occur in the conveyance guide. To eliminate this, it is necessary to properly set the direction of conveyance of the film by the pinch roller and the conveying pulley, but when the length of conveyance of the film is taken into account, high accuracy is required and design is difficult and also, cumbersome adjustment becomes necessary.

Also, in such an example of the prior art, when the rotational speed of the conveying pulley 110 is higher than the speed of the conveyor belt 104 and the conveying means changes from the conveying belt 104 to the conveying pulley 110, the two are driven at a time and the conveyor belt 104 becomes a load of conveyance and therefore, a friction force is applied between the microfilm F and the conveyor belt 104, and this has led to a problem that the microfilm or the conveyor belt is damaged.

Figure 2:
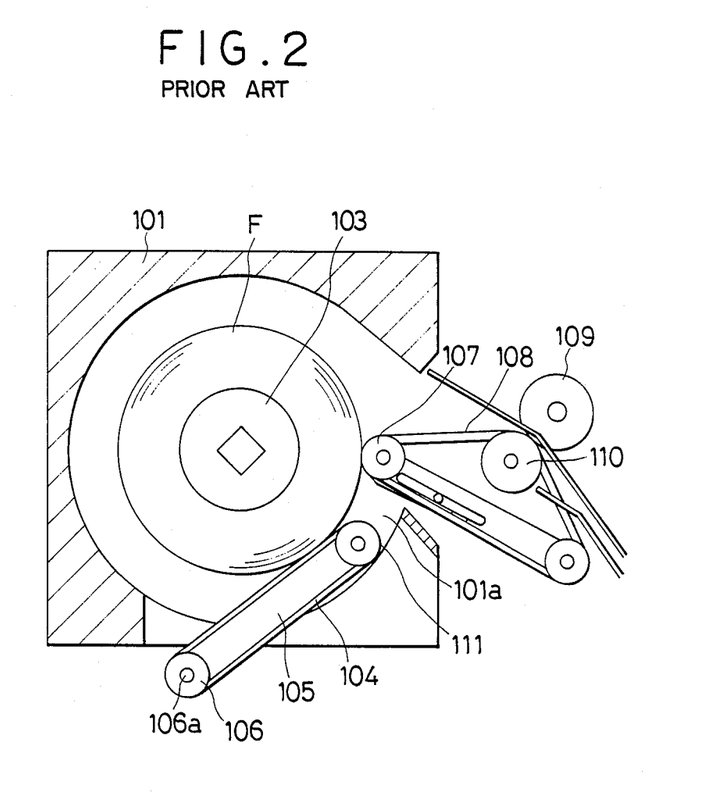
FIG. 2 is a cross-sectional view showing a state in which the roll diameter of the film in the apparatus of FIG. 1 is small.

Further, in such an example of the prior art, when the microfilm F is to be led out, the pivotable arm 105 is moved about a shaft 106a until the conveyor belt 104 is urged against the microfilm F and therefore, the angle of rotation of the pivotable arm 105 in the direction of arrow A varies depending on the roll diameter of the microfilm. That is, when the roll diameter of the microfilm F is great, the angle of rotation of the pivotable arm 105 is small as shown in FIG. 1, but when the roll diameter of the microfilm F is small, the angle of rotation of the pivotable arm 105 is great as shown in FIG. 2 of the accompanying drawings and thus, the fore end (the leading-out end portion) of the pivotable arm 105 comes into a roll containing portion 101a in the cartridge 101.

As a result, in the roll containing portion 101a, a bag portion 111 is formed between the cartridge 101 and the pivotable arm 105, and when the conveyance of the microfilm F is effected with the leading end edge of the microfilm being positioned between the separating gear 107 and the conveyor belt 104, the leading end edge of the microfilm comes into the bag portion 111, and this has led to a problem that conveyance becomes impossible.

SUMMARY OF THE INVENTION

It is a first object of the present invention to prevent jamming from occurring in the conveyance guide due to oblique movement of a film.

It is a second object of the present invention to prevent the conveyance load of a rolled film resulting from first conveying means (conveyor belt) and the damage by the friction therebetween.

It is a third object of the present invention to provide a film conveying apparatus which reliably accomplishes the leading-out of the leading end edge of a rolled film.

To achieve the above objects, in a film conveying apparatus wherein a rolled film is led out by first conveying means to thereby cause the film to arrive at a predetermined position and then the film is conveyed by second conveying means which is faster than the first conveying means, a conveyance guide is provided for guiding the film in a direction perpendicular to the direction of conveyance of the second conveying means, and the aforementioned second conveying means is so set as to release its pressure contact temporarily or intermittently.

Also, a friction force is prevented from being applied between the film and the first conveying means by means provided on the drive shaft of the first conveying means for transmitting rotation in one direction.

The first conveying means is a film conveying device of the type which urges a belt passed over a pivotable arm against a rolled film and rotates the belt to thereby convey said film to a leading-out port and in which the pivotable arm is protruded in a direction to be urged against the film to thereby ensure the leading-out end portion of the pivotable arm to be positioned outside said roll containing portion during the leading-out of the film, thus ensuring the film to be led out.

DESCRIPTION OF THE PREFERRED EMBODIMENTS

Figure 3:
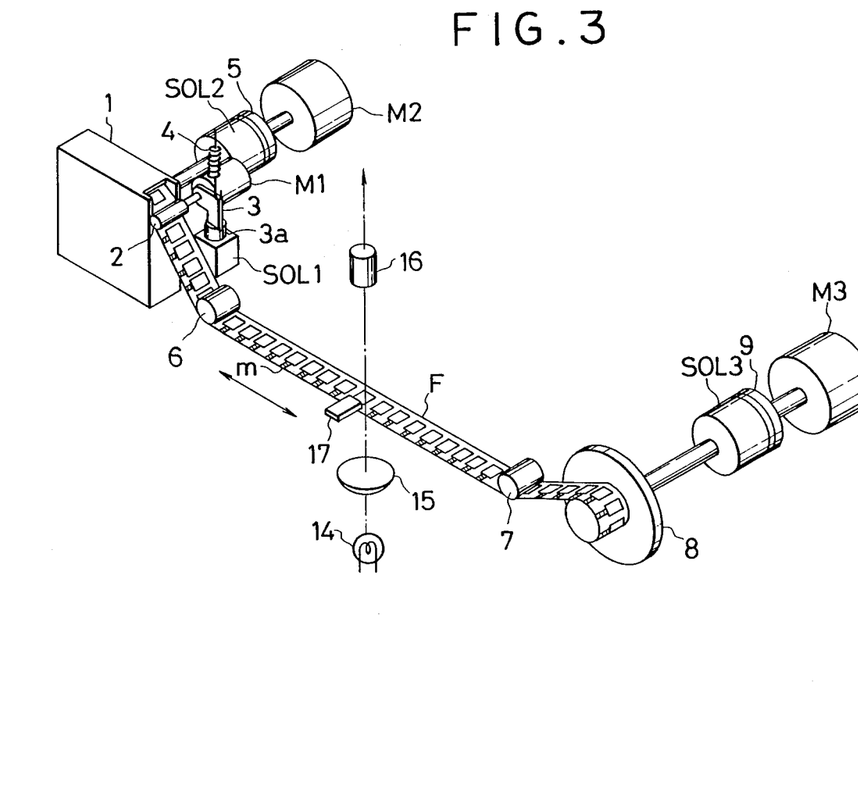
FIG. 3 is a perspective view showing the essential portions of a microfilm reader to which is applied an embodiment of a film conveying apparatus according to the present invention.

The invention will hereinafter be described with respect to some embodiments thereof shown in the drawings. FIG. 3 is a perspective view showing the essential portions of a microfilm reader to which is applied an embodiment of the film conveying apparatus according to the present invention. In FIG. 3, reference numeral 1 designates a supply cartridge containing therein a microfilm F as a rolled film, reference numeral 2 denotes a pinch roller for feeding out the microfilm F in the cartridge 1, M1 designates a motor for driving the pinch roller 2, M2 denotes a film rewinding motor for rotating a reel core 202 (see FIG. 4) in the cartridge 1, SOL1 designates a solenoid for bringing the pinch roller 2 into contact with the microfilm F through a support arm 3, reference numeral 4 denotes a spring for moving the support arm 3, a plunger 3a and the pinch roller 2 to thereby separate the pinch roller 2 from the microfilm F, and SOL2 designates a brake solenoid for the film rewinding motor M2. When the brake solenoid SOL2 is not operated, the motor M2 is revolvable, and when the brake solenoid SOL2 is operated, it attracts a brake plate 5 fixed to the motor shaft and prevents revolution of the motor M2.

Reference numerals 6 and 7 denote film guide rollers, reference numeral 8 designates a take-up reel, M3 denotes a film take-up motor for rotating the take-up reel 8, and SOL3 designates a brake solenoid for the motor M3. Although not shown, a guide plate is provided for guiding the film along the film feed path between the cartridge 1 and the take-up reel 8.

Reference numeral 14 denotes a lamp for illuminating the microfilm F, reference numeral 15 designates a condenser lens, reference numeral 16 denotes a projection lens for enlarging and projecting the image of the film F illuminated by the lamp 14 onto a screen (not shown), and reference numeral 17 designates a conventional mark detector for detecting a mark m for count provided at the side edge of each frame of the microfilm F.

The mark detector 17 has a photoelectric converting element, and when the film F is fed, the mark detector 17 produces a mark detection signal by the light ray from the lamp 14 being intercepted by the mark m, and this mark detection signal is counted by the counter of a retrieving device.

Figure 4:
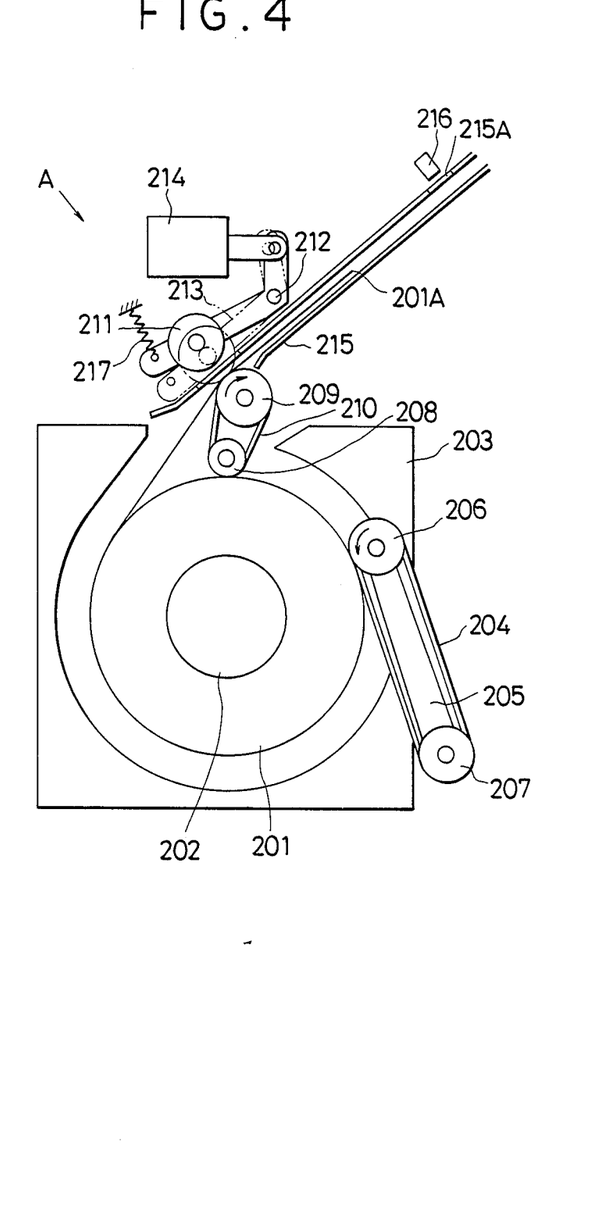
FIG. 4 is a cross-sectional view showing the leading-out portion of the film conveying apparatus according to the same embodiment.

FIG. 4 is a cross-sectional view of a film leading-out portion in an embodiment of the film conveying apparatus according to the present invention.

In FIG. 4, reference numeral 201 designates a microfilm wound in the form of a roll on a reel 202 and contained in a cartridge 203.

A belt 204 for conveying the film is in contact with the peripheral surface of the rolled film 201. The belt 204 is passed over pulleys 206 and 207 provided at the opposite ends of an arm 205, and is driven counterclockwise by a motor (not shown). The rolled film is rotatively driven in the direction of conveyance by the belt 204.

Reference numeral 208 designates a separating roller for separating the leading end 201A of the film from the roll portion. The separating roller 208 receives the rotational force of a drive roller 209 through a belt 210 and is rotated thereby. The drive roller 209 forwardly conveys the film 201 taken out of the cartridge 203 and cooperates with a pinch roller 211 to constitute conveying means. The drive roller 209 has its surface formed of rubber of high coefficient of friction, and urges the film 201 against the pinch roller 211 and conveys the film. The pinch roller 211 is rotatably mounted on an arm 213 pivotally movable about a fulcrum 212, and may be urged against the drive roller 209 by a plunger 214 connected to one end of the arm 213. When the plunger 214 is not operated, the pinch roller is separated from the drive roller 209 by the force of a tension spring 217 secured to the other end of the arm 213.

A conveyance guide 215 is provided in the conveyance of the film 201. The conveyance guide 215 is cylindrically shaped and controls the vertical direction of the film and also controls the widthwise direction of the film which is a direction perpendicular to the plane of the drawing sheet, and guides the film in a regular direction. A window 215A is provided in the forward portion of the conveyance guide 215, and a sensor 216 for detecting the leading end edge 201A of the film faces the window 215A. The plunger 214 is designed to be intermittently deenergized after the point of time at which the sensor 216 has detected the leading end edge 201A of the film.

Operation of the present embodiment constructed as described above will now be explained.

First, when a start command is input by a keyboard (not shown) or the like, the pulley 207, the drive roller 209 and the plunger 214 become operative as shown in FIG. 4, and the film 201 is conveyed clockwise by the drive of the belt 204, whereby the leading end edge 201A of the film is separated from the roll portion by the separating roller 208 and is directed to the drive roller 209 by the belt 210. At this time, the pinch roller 211 is urged against the drive roller 209 by the operation of the plunger 214 as indicated by dots-and-dash line, and the film is conveyed by this drive pressure.

Figure 5:
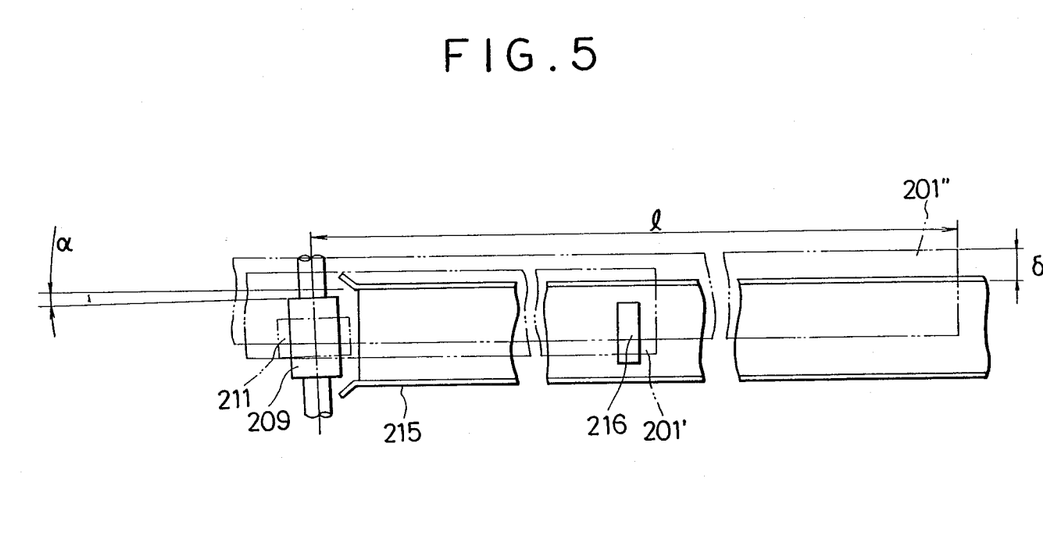
FIGS. 5 and 6 are views of the entrance portion of the conveyance guide and the conveying means in the apparatus of FIG. 4 as seen from the direction of arrow A in FIG. 4.

FIG. 5 is a view taken from the direction of arrow A in FIG. 4.

The state in which the film is conveyed when it is assumed that the direction of conveyance of the film by the pinch roller 211 and the drive roller 209 is inclined by an angle $\alpha$ with respect to the regular direction and that the conveyance guide 215 is absent is shown by dots-and-dash lines as films 201' and 201". As shown by the film 201", the amount of oblique movement $\delta$ in the conveyance distance l is expressed as $$\delta = l \tan \alpha.$$

Examining this with a specific numerical value, the conveyance distance when the conveyance to the retrieving device is considered is usually about 500 mm, and the value of the amount of oblique movement $\delta$ when it is assumed that the inclination $\alpha$ is minimized to 0.5° is $$\delta = 500 \times \tan 0.5° = 4.4 \text{ (mm)}.$$

That is, this amount of oblique movement is forced on the conveyance guide 215 and, if the conveyance guide is left as it is, the film will be damaged or jammed. Further, depending on the magnitude of the amount of oblique movement, the film may slip off the pinch roller 211.

So, in the apparatus of the present invention, the plunger 214 is controlled so as to be temporarily or intermittently deenergized after the point of time at which the signal from the sensor 216 which detects the leading end position of the film has been produced. As a result, the pinch roller 211 is separated from the drive roller 209, the drive pressure to the film is released and the film 201 is returned to its regular position in the conveyance guide 215. After the drive pressure has been released for a predetermined time, the plunger 214 again becomes energized, whereby the conveyance of the film is continued. If the film 201 is not returned to its regular position simply by the drive pressure of the pinch roller having been released temporarily, the release will be intermittently repeated several times.

That is, by the drive pressure being released within the tolerance of the amount of oblique movement, the film is returned to its predetermined position in the conveyance guide and therefore, the damage or jamming of the film caused by the film being urged into the conveyance guide can be prevented.

In the present embodiment, there has been shown an example in which the temporary or intermittent release of the conveyance drive force occurs after the detection of the leading end edge of the film by the sensor, but alternatively, the intermittent release may be set so as to start concurrently with the operation of the apparatus. Accordingly, in such case, the sensor will become unnecessary.

According to the above-described construction, the conveyance drive pressure of the film conveying means is made releasable and by the drive pressure being temporarily or intermittently released, the film can be returned to its regular position in the conveyance guide even when oblique movement of the film occurs due to the direction of drive being inclined and therefore, stable conveyance of the film can be accomplished without the film being damaged or jammed and thus, any trouble during the handling of the apparatus can be eliminated.

Also, before the conveyance of the film, the pinch roller 211 may be brought into its released state and the sensor 216 may be used as detecting means for detecting the leading end edge of the film, and an input signal may be supplied to control means, not shown, with the passage of the leading end edge 201A of the film. The control means may control the plunger 214 so as to be energized along therewith.

Figure 6:
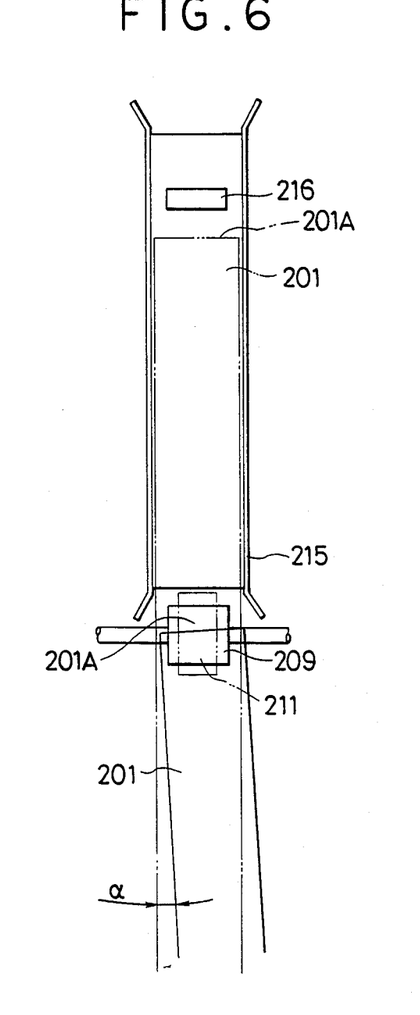

If the pinch roller 211 is urged against the drive roller 209 when the film 201 is inclined by an angle α with respect to the regular direction of conveyance and comes to the drive roller 209 as shown in FIG. 6, the conveyance pressure will be applied to the film 201 while the direction of the film 201 remains inclined and therefore, the film will be moved obliquely and the leading end edge 201A of the film will be urged against the guide 215, whereby movement of the film will be hampered and jamming of the film will occur.

In contrast, in the present embodiment, the pinch roller 211 is already released at this time and therefore, the leading end edge 201A of the film is guided by the conveyance guide 215 and the direction thereof is corrected, so that the film is conveyed in a predetermined direction as indicated by dots-and-dash lines in FIG. 6. When the leading end edge 201A of the film arrives at the sensor 216, the plunger 214 is operated by the control means in response to the detection signal from the sensor 216 which is indicative of the detection of the leading end edge 201A of the film, whereby the arm 213 is pivotally moved and the film 201 is pressed between the pinch roller 211 and the drive roller 209. Thereby the conveyance pressure of the drive roller 209 is transmitted to the film 201 and the film 201 is conveyed.

In this manner, the conveyance pressure is applied to the film after the direction of the film has been corrected and therefore, no oblique movement of the film occurs and stable conveyance of the film is accomplished without the film being jammed.

In the present embodiment, the conveyance pressure of the conveying means is made releasable and a sensor for detecting the leading end edge of the film is provided at a predetermined distance ahead of the conveyance drive position of the conveying means so that the conveyance pressure may be applied to the film when the leading end edge of the film arrives at the position of the sensor beyond the conveyance drive position and the direction of movement of the film becomes fixed and therefore, a stable conveying operation is provided without oblique movement of the film and further, no conveyance pressure is applied to the leading end edge of the film and thus, conveyance of the film can be accomplished very smoothly without the leading end edge of the film being damaged.

Figures 7, 8:
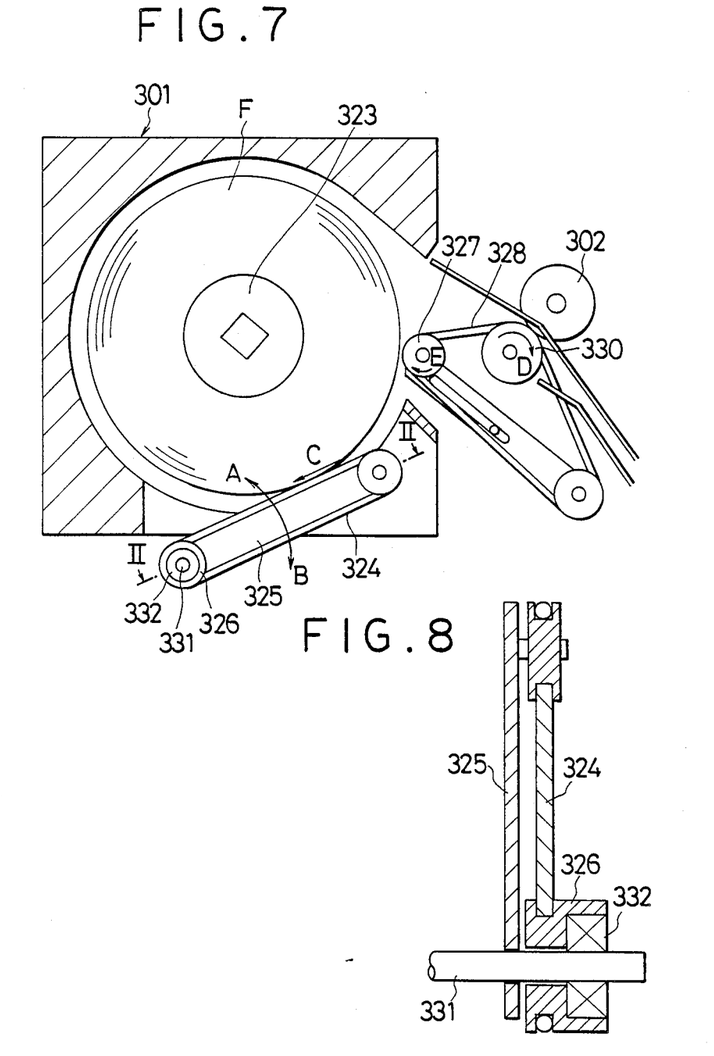
FIG. 7 is a cross-sectional view showing the leading-out portion of a film conveying apparatus to which the present invention is applied.
FIG. 8 is a cross-sectional view of the essential portions of the FIG. 7 apparatus.

Referring now to FIGS. 7 and 8, a microfilm F wound on a reel core 323 is rotatably mounted in a cartridge 301. A conveyor belt 324 as first conveying means is rotated in the direction of arrow C by a pulley 326, and a pivotable arm 325 is pivotally moved in the directions of arrows A and B to thereby urge the conveyor belt 324 against and away from the microfilm F. A conveying pulley 330 as second conveying means is rotatively driven in the direction of arrow D to rotate a separating gear 327 in the direction of arrow E through the intermediary of a belt 328. A pinch roller 302 cooperates with the pulley 330 to convey the microfilm F.

Reference numeral 332 designates a one-way clutch as means for transmitting rotation in one direction. The one-way clutch 332 is forced into the pulley 326 and is adapted to idly rotate counterclockwise relative to a drive shaft 331. The pulley 326 is driven by the drive shaft 331 through the one-way clutch 332.

In the above-described construction, the leading-out and conveyance of the microfilm F are accomplished in the following manner. The pivotable arm 325 is first pivotally moved in the direction of arrow A to urge the conveyor belt 324 against the microfilm F. At this time, the conveyor belt 324 is being rotated in the direction of arrow C by the pulley 326 and therefore, the leading end edge of the microfilm F is conveyed to the separating gear 327. Thereupon, the leading end edge of the microfilm F is taken out by the tooth top of the separating gear 327 which is rotating in the direction of arrow E, and the microfilm F is conveyed while being held between the conveying pulley 330 and the pinch roller 302. At this time, the conveyance speed of the microfilm F becomes higher than the speed of the conveyor belt 324, but since the conveyor belt 324 becomes idly rotatable in the direction arrow C by the one-way clutch 332, the microfilm F can be smoothly conveyed without the conveyance speed being reduced and moreover, without the microfilm F being damaged.

In the above-described embodiment, a one-way clutch is employed as means for transmitting rotation in one direction, whereas this is not restrictive, but for example, a ratchet or the like may be provided.

According to the construction and operation as described above, means is provided for transmitting rotation to the drive shaft of the first conveying means in one direction and therefore, the conveyance load to the film by the first conveying means can be eliminated and the film or the first conveying means can be reliably prevented from being damaged and as a result, the rolled film can be smoothly conveyed by the second conveying means.

Figure 9:
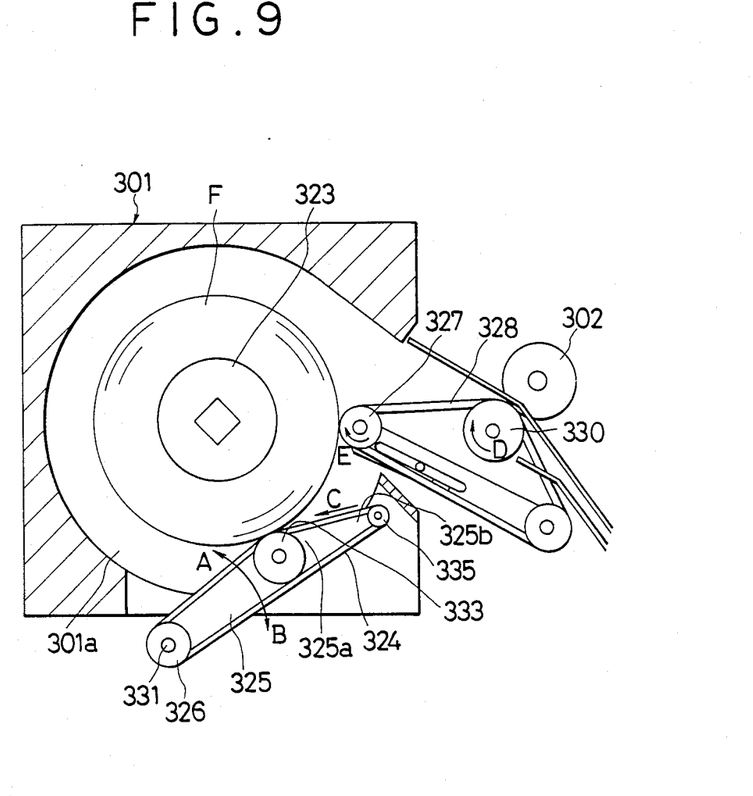
FIG. 9 is a cross-sectional view showing the leading-out portion of a film conveying apparatus to which the present invention is applied.

Referring now to FIG. 9, the pivotable arm 325 is formed in a substantially triangular shape and that side thereof which is urged against the microfilm F is protrudingly formed as indicated at 325a, and a pulley 333 is mounted on the protruding portion 325a. The pulley 326 is driven by a drive shaft 331 which provides the pivot of the pivotable arm 325 and is mounted on one end of the pivotable arm 325, and as regards the other end of the pivotable arm 325, a pulley 335 is mounted on the leading-out end portion 325b thereof for the microfilm F.

In the above-described construction, the leading-out and conveyance of the microfilm F are accomplished in the following manner. The pivotable arm 325 is first moved in the direction of arrow A to thereby urge the conveyor belt 324 against the microfilm F. Even if at this time, the roll diameter of the microfilm F is small and the pivotable arm 325 is greatly rotated in the direction of arrow A, the leading-out end portion 325b of the pivotable arm 325 is prevented from entering a roll containing portion 301a by the protruding portion 325a of the pivotable arm 325 and thus becomes positioned outside the roll containing portion 301a. Accordingly, any bag portion as in the prior art is not formed and the leading end edge of the microfilm F is conveyed to the separating gear 327 because the conveyor belt 324 is being rotated in the direction of arrow C by the pulley 326. Then, the leading end edge of the microfilm F is taken out by the tooth top of the separating gear 327 which is rotating in the direction of arrow E and the microfilm F is conveyed while being held by and between the conveying pulley 330 and the pinch roller 302.

Thus, in the above-described embodiment, any bag portion is not formed in the roll containing portion 301a within the cartridge 301 as in the prior art, and it does not happen that the leading end edge of the microfilm F is caught by the leading-out end portion 325b of the pivotable arm 325.

As described above, when the pivotable arm is protruded in the direction to be urged against the film, the leading-out end portion of the pivotable arm is ensured to be positioned outside the roll containing portion during the leading-out of the film and therefore, the leading-out of the film can be accomplished reliably, and this leads to the possibility of providing a film conveying apparatus which is greatly improved in reliability.

We claim:

1. A film conveying apparatus comprising;
   means for conveying a film in a lengthwise direction, said film conveying means being in pressure contact with a surface of the film led from a film roll to convey the film by frictional force;
   means for guiding side periphery of the film to position it within a predetermined area;
   means for releasing the pressure contact between said conveying means and the film so that a portion of the film led from the film roll and conveyed by said conveying means may be guided only by said guiding means in a widthwise direction of the film.

2. A film conveying apparatus according to claim 1, wherein said releasing means is actuated intermittently so as to release the pressure contact between said conveying means and the film.

3. A film conveying apparatus according to claim 1, wherein said releasing means is actuated for a predetermined time after a leading end of the film has passed by said conveying means so as to release the pressure contact between said conveying means and the film.

4. A film conveying apparatus according to claim 1, wherein said conveying means includes:
   rotary driving means for driving the film; and
   a driving source for driving said rotary driving means.

5. A film conveying apparatus according to claim 4, wherein said rotary driving means for driving the film includes a driving roller which is driven by the driving source.

6. A film conveying apparatus according to claim 5, further comprising an idle roller for urging the film against the driving roller.

7. A film conveying apparatus according to claim 6, wherein said releasing means includes means for moving the idle roller away from the driving roller.

8. A film conveying apparatus comprising:
   means for rotating a film roll on which a film is wound in a direction so that a leading end of the film is advanced in a lengthwise direction;
   means for conveying the film by a frictional force generated against a surface of the film led from the film roll;
   means for guiding side periphery of the film led from the film roll to position it within a predetermined area;
   means for detecting the leading end of the film, said detecting means being positioned on a downstream side of said conveying means in the film conveying direction to output a signal when the leading end of the film passes by a predetermined position;
   means for releasing the frictional force of said conveying means on the film, said releasing means permitting the film led from the film roll to be guided in a widthwise direction only by said guiding means in association with the signal output from said film leading end detecting means.

9. A film conveying apparatus according to claim 8, wherein said rotating means includes rotary driving means for rotating the film roll by exerting a frictional force against a circumferential surface of the film roll.

10. A film conveying apparatus according to claim 9, wherein said rotary driving means is an endless belt urged against the roll.

11. A film conveying apparatus according to claim 8, wherein said conveying means includes a rotary member for driving, and a driving source for rotating said rotary member.

12. A film conveying apparatus according to claim 9, wherein said rotary driving means for rotating the film roll includes a driving roller, and a driving source which rotates the driving roller.

13. A film conveying apparatus according to claim 12, further including an idle roller for urging the film against the driving roller.

14. A film conveying apparatus according to claim 13, wherein said releasing means includes means for moving said idle roller away from the driving roller.

15. A film conveying apparatus according to claim 8, wherein said releasing means is actuated for a predetermined period of time after the signal has been output from said film leading end detecting means so as to release the frictional force exerted on the film.

16. A film conveying apparatus according to claim 8, wherein said releasing means is actuated before the signal is output from said film leading end detecting means so as to release the frictional force exerted on the film.

17. A film conveying apparatus according to claim 8, wherein said releasing means is actuated intermittently after said film detecting means has output the signal so as to release the frictional force exerted on the film.

* * * * *